US012352973B2

(12) United States Patent
Odom et al.

(10) Patent No.: US 12,352,973 B2
(45) Date of Patent: Jul. 8, 2025

(54) ZONAL LENSES FOR A HEAD-MOUNTED DISPLAY (HMD) DEVICE

(71) Applicant: Meta Platforms Technologies, LLC, Menlo Park, CA (US)

(72) Inventors: Garret Odom, Tucson, AZ (US); Robin Sharma, Woodinville, WA (US); Neil Naples, Redmond, WA (US); Qi Zhang, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 525 days.

(21) Appl. No.: 17/831,066

(22) Filed: Jun. 2, 2022

(65) Prior Publication Data

US 2023/0393399 A1    Dec. 7, 2023

(51) Int. Cl.
*G02B 27/01*     (2006.01)
*G02B 27/00*     (2006.01)

(52) U.S. Cl.
CPC ..... *G02B 27/0172* (2013.01); *G02B 27/0093* (2013.01); *G02B 2027/011* (2013.01); *G02B 2027/0178* (2013.01)

(58) Field of Classification Search
CPC .......... G02B 2027/011; G02B 27/0172; G02B 2027/0178; G02B 27/0093
See application file for complete search history.

(56) References Cited

U.S. PATENT DOCUMENTS

| | | | |
|---|---|---|---|
| 2018/0074320 A1* | 3/2018 | Wheelwright | G02B 3/08 |
| 2018/0081092 A1* | 3/2018 | Hudman | G02B 3/04 |
| 2019/0004325 A1* | 1/2019 | Connor | G02B 27/0172 |
| 2022/0075187 A1* | 3/2022 | Grahsl | G06F 3/04815 |

FOREIGN PATENT DOCUMENTS

WO    WO-2023007329 A1 * 2/2023

* cited by examiner

*Primary Examiner* — Jia X Pan
(74) *Attorney, Agent, or Firm* — Greenberg Traurig, LLP

(57) ABSTRACT

An optical element may include two or more zones to perform functions in a head-mounted display (HMD) device. An optical component may include a first optical zone characterized by a first sag profile to correct a refractive error of an eye of a user and a second optical zone characterized by a second sag profile to redirect a path of an illumination light beam. A transition zone located between the first optical zone and the second optical zone may provide a smooth transition between the first optical zone and the second optical zone.

20 Claims, 11 Drawing Sheets

ZONAL LENSES FOR A HEAD-MOUNTED DISPLAY (HMD) DEVICE

TECHNICAL FIELD

This patent application relates generally to optical lenses and components, and more specifically, to optical zonal lenses for various optical assemblies and systems, such as head-mounted display (HMD) devices.

BACKGROUND

With recent advances in technology, prevalence and proliferation of content creation and delivery has increased greatly in recent years. In particular, interactive content such as virtual reality (VR) content, augmented reality (AR) content, mixed reality (MR) content, and content within and associated with a real and/or virtual environment (e.g., a "metaverse") has become appealing to consumers.

To facilitate delivery of this and other related content, service providers have endeavored to provide various forms of wearable display systems. One such example may be a head-mounted display (HMD) device, such as a wearable eyewear, a wearable headset, or eyeglasses. In some examples, the head-mounted display (HMD) device may project or direct light to form a first image and a second image, and with these images, to generate "binocular" vision for viewing by a user. Providing quality optical lenses for such devices may be challenging. For example, some users of head-mounted display (HMD) devices have impaired vision, such as hyperopia or myopia, which can be adversely affected by even the slightest refractive error. Furthermore, providing optical lenses that can concurrently provide beam shaping and smooth transitions may be important in such head-mounted display (HMD) devices.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

DETAILED DESCRIPTION

Figure 1:
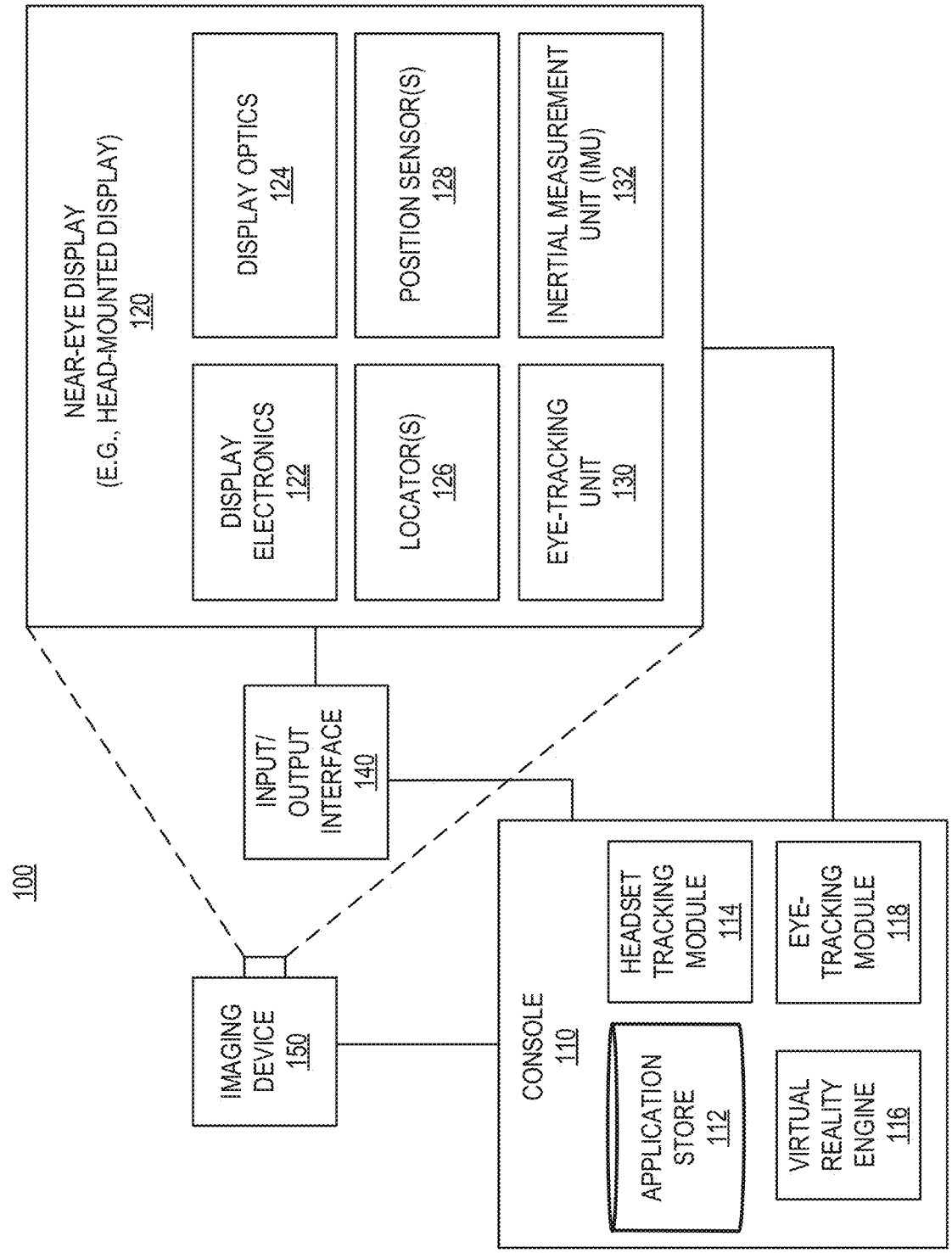
FIG. 1 illustrates a block diagram of an artificial reality system environment including a near-eye display, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

Some users of head-mounted display devices may use corrective lenses to correct refractive errors in their vision. For example, contact lenses or prescription eyeglasses may be worn in conjunction with a head-mounted display (HMD) device. However, contact lenses can dry out quickly with the reduced blink rate that is characteristic of some users of head-mounted display devices. Wearing prescription eyeglasses may involve the use of an adapter and may not be possible with eyeglasses that have large frames.

Lenticular or zonal lenses may be used in ophthalmics for users who have high degrees of ametropia (e.g., hyperopia or myopia) that may involve the use of high power lenses. High lens powers may increase the thickness of the lens; lenticular or zonal lenses may be used when a high power lens may otherwise be exceedingly thick. Lenticular zones may be used to control edge thickness, improving comfort by reducing the weight of the lens.

Disclosed herein are systems, methods, and apparatuses that may use zonal lenses to improve, enhance, and/or enable the functionality of head-mounted display (HMD) devices. For example, portions of a lens that are not used for viewing the world or a display may be thinned to reduce the weight of the lens. As another example, the surface of the lens may be separated into zones that serve different functional purposes. Various disclosed examples may divide a lens into multiple functional zones separated by boundaries or transition zones. The functional zones may have arbitrary shapes to achieve the desired functionality of the zones.

According to various examples, a monolithic optical element may include two or more zones to perform functions in a head-mounted display (HMD) device. An optical component may include a first optical zone characterized by a first sag profile to correct a refractive error of an eye of a user and a second optical zone characterized by a second sag profile to redirect a path of an illumination light beam. A transition zone located between the first optical zone and the second optical zone may provide a smooth transition between the first optical zone and the second optical zone.

FIG. 1 illustrates a block diagram of an artificial reality system environment 100 including a near-eye display, according to an example. As used herein, a "near-eye display" may refer to a device (e.g., an optical device) that may be in close proximity to a user's eye. As used herein, "artificial reality" may refer to aspects of, among other things, a "metaverse" or an environment of real and virtual elements, and may include use of technologies associated with virtual reality (VR), augmented reality (AR), and/or mixed reality (MR). As used herein a "user" may refer to a user or wearer of a "near-eye display."

As shown in FIG. 1, the artificial reality system environment 100 may include a near-eye display 120, an optional external imaging device 150, and an optional input/output interface 140, each of which may be coupled to a console 110. The console 110 may be optional in some instances as the functions of the console 110 may be integrated into the near-eye display 120. In some examples, the near-eye display 120 may be a head-mounted display (HMD) that presents content to a user.

In some instances, for a near-eye display system, it may generally be desirable to expand an eyebox, reduce display haze, improve image quality (e.g., resolution and contrast), reduce physical size, increase power efficiency, and increase or expand field of view (FOV). As used herein, "field of view" (FOV) may refer to an angular range of an image as seen by a user, which is typically measured in degrees as observed by one eye (for a monocular HMD) or both eyes (for binocular HMDs). Also, as used herein, an "eyebox" may be a two-dimensional box that may be positioned in front of the user's eye from which a displayed image from an image source may be viewed.

In some examples, in a near-eye display system, light from a surrounding environment may traverse a "see-through" region of a waveguide display (e.g., a transparent substrate) to reach a user's eyes. For example, in a near-eye display system, light of projected images may be coupled into a transparent substrate of a waveguide, propagate within the waveguide, and be coupled or directed out of the waveguide at one or more locations to replicate exit pupils and expand the eyebox.

In some examples, the near-eye display 120 may include one or more rigid bodies, which may be rigidly or non-rigidly coupled to each other. In some examples, a rigid coupling between rigid bodies may cause the coupled rigid bodies to act as a single rigid entity, while in other examples, a non-rigid coupling between rigid bodies may allow the rigid bodies to move relative to each other.

In some examples, the near-eye display 120 may be implemented in any suitable form-factor, including a HMD, a pair of glasses, or other similar wearable eyewear or device. Examples of the near-eye display 120 are further described below with respect to FIGS. 2 and 3. Additionally, in some examples, the functionality described herein may be used in a HMD or headset that may combine images of an environment external to the near-eye display 120 and artificial reality content (e.g., computer-generated images). Therefore, in some examples, the near-eye display 120 may augment images of a physical, real-world environment external to the near-eye display 120 with generated and/or overlaid digital content (e.g., images, video, sound, etc.) to present an augmented reality to a user.

In some examples, the near-eye display 120 may include any number of display electronics 122, display optics 124, and an eye-tracking unit 130. In some examples, the near eye display 120 may also include one or more locators 126, one or more position sensors 128, and an inertial measurement unit (IMU) 132. In some examples, the near-eye display 120 may omit any of the eye-tracking unit 130, the one or more locators 126, the one or more position sensors 128, and the inertial measurement unit (IMU) 132, or may include additional elements.

In some examples, the display electronics 122 may display or facilitate the display of images to the user according to data received from, for example, the optional console 110. In some examples, the display electronics 122 may include one or more display panels. In some examples, the display electronics 122 may include any number of pixels to emit light of a predominant color such as red, green, blue, white, or yellow. In some examples, the display electronics 122 may display a three-dimensional (3D) image, e.g., using stereoscopic effects produced by two-dimensional panels, to create a subjective perception of image depth.

In some examples, the display optics 124 may display image content optically (e.g., using optical waveguides and/or couplers) or magnify image light received from the display electronics 122, correct optical errors associated with the image light, and/or present the corrected image light to a user of the near-eye display 120. In some examples, the display optics 124 may include a single optical element or any number of combinations of various optical elements as well as mechanical couplings to maintain relative spacing and orientation of the optical elements in the combination. In some examples, one or more optical elements in the display optics 124 may have an optical coating, such as an anti-reflective coating, a reflective coating, a filtering coating, and/or a combination of different optical coatings.

In some examples, the display optics 124 may also be designed to correct one or more types of optical errors, such as two-dimensional optical errors, three-dimensional optical errors, or any combination thereof. Examples of two-dimensional errors may include barrel distortion, pincushion distortion, longitudinal chromatic aberration, and/or transverse chromatic aberration. Examples of three-dimensional errors may include spherical aberration, chromatic aberration field curvature, and astigmatism.

In some examples, the one or more locators 126 may be objects located in specific positions relative to one another and relative to a reference point on the near-eye display 120. In some examples, the optional console 110 may identify the one or more locators 126 in images captured by the optional external imaging device 150 to determine the artificial reality headset's position, orientation, or both. The one or more locators 126 may each be a light-emitting diode (LED), a corner cube reflector, a reflective marker, a type of light source that contrasts with an environment in which the near-eye display 120 operates, or any combination thereof.

In some examples, the external imaging device 150 may include one or more cameras, one or more video cameras, any other device capable of capturing images including the one or more locators 126, or any combination thereof. The optional external imaging device 150 may be configured to detect light emitted or reflected from the one or more locators 126 in a field of view of the optional external imaging device 150.

In some examples, the one or more position sensors 128 may generate one or more measurement signals in response to motion of the near-eye display 120. Examples of the one or more position sensors 128 may include any number of accelerometers, gyroscopes, magnetometers, and/or other motion-detecting or error-correcting sensors, or any combination thereof.

In some examples, the inertial measurement unit (IMU) 132 may be an electronic device that generates fast calibration data based on measurement signals received from the one or more position sensors 128. The one or more position sensors 128 may be located external to the inertial measurement unit (IMU) 132, internal to the inertial measurement unit (IMU) 132, or any combination thereof. Based on the one or more measurement signals from the one or more position sensors 128, the inertial measurement unit (IMU) 132 may generate fast calibration data indicating an estimated position of the near-eye display 120 that may be relative to an initial position of the near-eye display 120. For example, the inertial measurement unit (IMU) 132 may integrate measurement signals received from accelerometers over time to estimate a velocity vector and integrate the velocity vector over time to determine an estimated position of a reference point on the near-eye display 120. Alternatively, the inertial measurement unit (IMU) 132 may provide the sampled measurement signals to the optional console 110, which may determine the fast calibration data.

The eye-tracking unit 130 may include one or more eye-tracking systems. As used herein, "eye tracking" may refer to determining an eye's position or relative position, including orientation, location, and/or gaze of a user's eye. In some examples, an eye-tracking system may include an imaging system that captures one or more images of an eye and may optionally include a light emitter, which may generate light that is directed to an eye such that light reflected by the eye may be captured by the imaging system. In other examples, the eye-tracking unit 130 may capture reflected radio waves emitted by a miniature radar unit. These data associated with the eye may be used to determine or predict eye position, orientation, movement, location, and/or gaze.

In some examples, the near-eye display 120 may use the orientation of the eye to introduce depth cues (e.g., blur image outside of the user's main line of sight), collect heuristics on the user interaction in the virtual reality (VR) media (e.g., time spent on any particular subject, object, or frame as a function of exposed stimuli), some other functions that are based in part on the orientation of at least one of the user's eyes, or any combination thereof. In some examples, because the orientation may be determined for both eyes of the user, the eye-tracking unit 130 may be able to determine where the user is looking or predict any user patterns, etc.

In some examples, the input/output interface 140 may be a device that allows a user to send action requests to the optional console 110. As used herein, an "action request" may be a request to perform a particular action. For example, an action request may be to start or to end an application or to perform a particular action within the application. The input/output interface 140 may include one or more input devices. Example input devices may include a keyboard, a mouse, a game controller, a glove, a button, a touch screen, or any other suitable device for receiving action requests and communicating the received action requests to the optional console 110. In some examples, an action request received by the input/output interface 140 may be communicated to the optional console 110, which may perform an action corresponding to the requested action.

In some examples, the optional console 110 may provide content to the near-eye display 120 for presentation to the user in accordance with information received from one or more of external imaging device 150, the near-eye display 120, and the input/output interface 140. For example, in the example shown in FIG. 1, the optional console 110 may include an application store 112, a headset tracking module 114, a virtual reality engine 116, and an eye-tracking module 118. Some examples of the optional console 110 may include different or additional modules than those described in conjunction with FIG. 1. Functions further described below may be distributed among components of the optional console 110 in a different manner than is described here.

In some examples, the optional console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In some examples, the modules of the optional console 110 described in conjunction with FIG. 1 may be encoded as instructions in the non-transitory computer-readable storage medium that, when executed by the processor, cause the processor to perform the functions further described below. It should be appreciated that the optional console 110 may or may not be needed or the optional console 110 may be integrated with or separate from the near-eye display 120.

In some examples, the application store 112 may store one or more applications for execution by the optional console 110. An application may include a group of instructions that, when executed by a processor, generates content for presentation to the user. Examples of the applications may include gaming applications, conferencing applications, video playback application, or other suitable applications.

In some examples, the headset tracking module 114 may track movements of the near-eye display 120 using slow calibration information from the external imaging device 150. For example, the headset tracking module 114 may determine positions of a reference point of the near-eye display 120 using observed locators from the slow calibration information and a model of the near-eye display 120. Additionally, in some examples, the headset tracking module 114 may use portions of the fast calibration information, the slow calibration information, or any combination thereof, to predict a future location of the near-eye display 120. In some examples, the headset tracking module 114 may provide the estimated or predicted future position of the near-eye display 120 to the virtual reality engine 116.

In some examples, the virtual reality engine 116 may execute applications within the artificial reality system environment 100 and receive position information of the near-eye display 120, acceleration information of the near-eye display 120, velocity information of the near-eye display 120, predicted future positions of the near-eye display 120, or any combination thereof from the headset tracking module 114. In some examples, the virtual reality engine 116 may also receive estimated eye position and orientation information from the eye-tracking module 118. Based on the received information, the virtual reality engine 116 may determine content to provide to the near-eye display 120 for presentation to the user.

In some examples, the eye-tracking module 118 may receive eye-tracking data from the eye-tracking unit 130 and determine the position of the user's eye based on the eye tracking data. In some examples, the position of the eye may include an eye's orientation, location, or both relative to the near-eye display 120 or any element thereof. So, in these examples, because the eye's axes of rotation change as a function of the eye's location in its socket, determining the eye's location in its socket may allow the eye-tracking module 118 to more accurately determine the eye's orientation.

In some examples, a location of a projector of a display system may be adjusted to enable any number of design modifications. For example, in some instances, a projector may be located in front of a viewer's eye (i.e., "front-mounted" placement). In a front-mounted placement, in some examples, a projector of a display system may be located away from a user's eyes (i.e., "world-side"). In some examples, a head-mounted display (HMD) device may utilize a front-mounted placement to propagate light towards a user's eye(s) to project an image.

Figure 2:
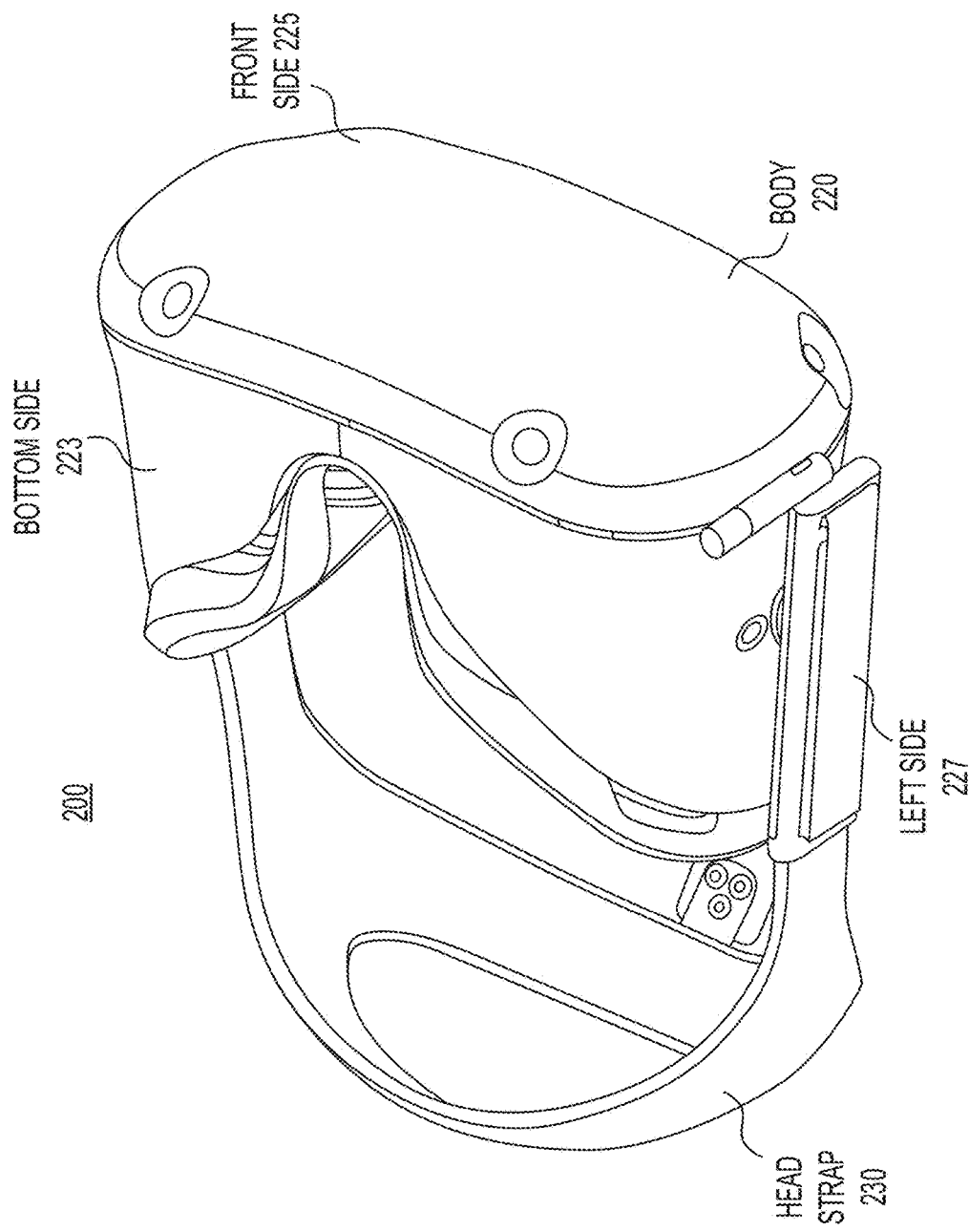
FIG. 2 illustrates a perspective view of a near-eye display in the form of a head-mounted display (HMD) device, according to an example.

FIG. 2 illustrates a perspective view of a near-eye display in the form of a head-mounted display (HMD) device 200, according to an example. In some examples, the HMD device 200 may be a part of a virtual reality (VR) system, an augmented reality (AR) system, a mixed reality (MR) system, another system that uses displays or wearables, or any combination thereof. In some examples, the HMD device 200 may include a body 220 and a head strap 230. FIG. 2 shows a bottom side 223, a front side 225, and a left side 227 of the body 220 in the perspective view. In some examples, the head strap 230 may have an adjustable or extendible length. In particular, in some examples, there may be a sufficient space between the body 220 and the head strap 230 of the HMD device 200 for allowing a user to mount the HMD device 200 onto the user's head. For example, the length of the head strap 230 may be adjustable to accommodate a range of user head sizes. In some examples, the HMD device 200 may include additional, fewer, and/or different components.

In some examples, the HMD device 200 may present, to a user, media or other digital content including virtual and/or augmented views of a physical, real-world environment with computer-generated elements. Examples of the media or digital content presented by the HMD device 200 may include images (e.g., two-dimensional (2D) or three-dimensional (3D) images), videos (e.g., 2D or 3D videos), audio, or any combination thereof. In some examples, the images and videos may be presented to each eye of a user by one or more display assemblies (not shown in FIG. 2) enclosed in the body 220 of the HMD device 200.

In some examples, the HMD device 200 may include various sensors (not shown), such as depth sensors, motion sensors, position sensors, and/or eye tracking sensors. Some of these sensors may use any number of structured or unstructured light patterns for sensing purposes. In some examples, the HMD device 200 may include an input/output interface 140 for communicating with a console 110, as described with respect to FIG. 1. In some examples, the HMD device 200 may include a virtual reality engine (not shown), but similar to the virtual reality engine 116 described with respect to FIG. 1, that may execute applications within the HMD device 200 and receive depth information, position information, acceleration information, velocity information, predicted future positions, or any combination thereof of the HMD device 200 from the various sensors.

In some examples, the information received by the virtual reality engine 116 may be used for producing a signal (e.g., display instructions) to the one or more display assemblies. In some examples, the HMD device 200 may include locators (not shown), but similar to the virtual locators 126 described in FIG. 1, which may be located in fixed positions on the body 220 of the HMD device 200 relative to one another and relative to a reference point. Each of the locators may emit light that is detectable by an external imaging device. This may be useful for the purposes of head tracking or other movement/orientation. It should be appreciated that other elements or components may also be used in addition or in lieu of such locators.

It should be appreciated that in some examples, a projector mounted in a display system may be placed near and/or closer to a user's eye (i.e., "eye-side"). In some examples, and as discussed herein, a projector for a display system shaped liked eyeglasses may be mounted or positioned in a temple arm (i.e., a top far corner of a lens side) of the eyeglasses. It should be appreciated that, in some instances, utilizing a back-mounted projector placement may help to reduce size or bulkiness of any required housing required for a display system, which may also result in a significant improvement in user experience for a user.

Figure 3:
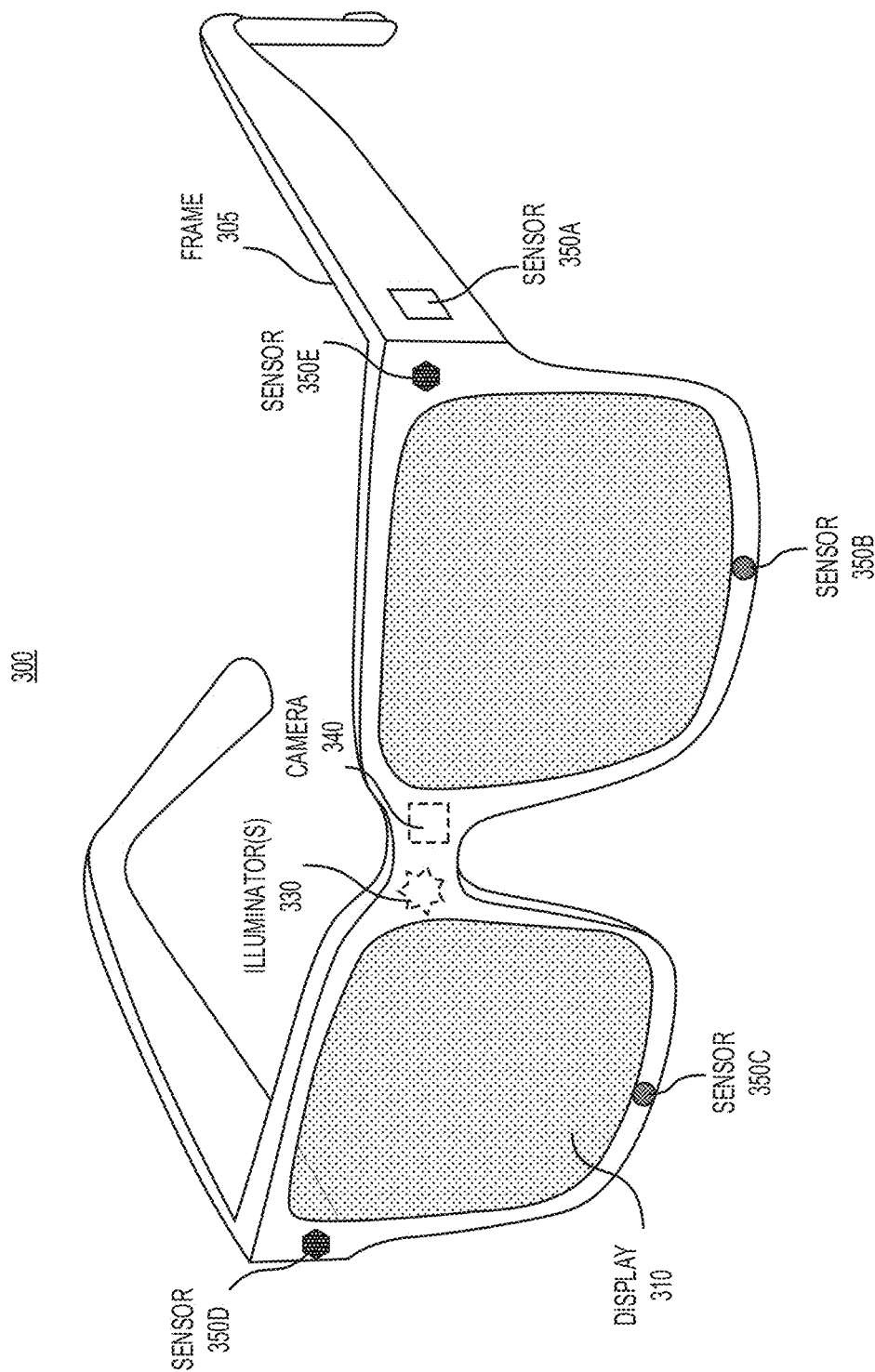
FIG. 3 illustrates a perspective view of a near-eye display in the form of a pair of glasses, according to an example.

FIG. 3 is a perspective view of a near-eye display 300 in the form of a pair of glasses (or other similar eyewear), according to an example. In some examples, the near-eye display 300 may be a specific example of near-eye display 120 of FIG. 1, and may be configured to operate as a virtual reality display, an augmented reality display, and/or a mixed reality display.

In some examples, the near-eye display 300 may include a frame 305 and a display 310. In some examples, the display 310 may be configured to present media or other content to a user. In some examples, the display 310 may include display electronics and/or display optics, similar to components described with respect to FIGS. 1-2. For example, as described above with respect to the near-eye display 120 of FIG. 1, the display 310 may include a liquid crystal display (LCD) display panel, a light-emitting diode (LED) display panel, or an optical display panel (e.g., a waveguide display assembly). In some examples, the display 310 may also include any number of optical components, such as waveguides, gratings, lenses, mirrors, etc.

In some examples, the near-eye display 300 may further include various sensors 350a, 350b, 350c, 350d, and 350e on or within a frame 305. In some examples, the various sensors 350a-350e may include any number of depth sensors, motion sensors, position sensors, inertial sensors, and/or ambient light sensors, as shown. In some examples, the various sensors 350a-350e may include any number of image sensors configured to generate image data representing different fields of views in one or more different directions. In some examples, the various sensors 350a-350e may be used as input devices to control or influence the displayed content of the near-eye display 300, and/or to provide an interactive virtual reality (VR), augmented reality (AR), and/or mixed reality (MR) experience to a user of the near-eye display 300. In some examples, the various sensors 350a-350e may also be used for stereoscopic imaging or other similar application.

In some examples, the near-eye display 300 may further include one or more illuminators 330 to project light into a physical environment. The projected light may be associated with different frequency bands (e.g., visible light, infra-red light, ultra-violet light, etc.), and may serve various purposes. In some examples, the one or more illuminator(s) 330 may be used as locators, such as the one or more locators 126 described above with respect to FIGS. 1-2.

In some examples, the near-eye display 300 may also include a camera 340 or other image capture unit. The camera 340, for instance, may capture images of the physical environment in the field of view. In some instances, the captured images may be processed, for example, by a virtual reality engine (e.g., the virtual reality engine 116 of FIG. 1)

to add virtual objects to the captured images or modify physical objects in the captured images, and the processed images may be displayed to the user by the display 310 for augmented reality (AR) and/or mixed reality (MR) applications.

According to various examples, a zonal lens may include two or more optical zones that perform functions in a head-mounted display (HMD) device. The optical zones may include one or more zones that provide vision correction for the user. In some examples, the optical zones may include a zone that performs beam shaping and/or steering of integrated illumination sources. In some examples, the optical zones may include a zone that serves as a flat or curved viewing window for an integrated sensor or camera.

Each optical zone may be characterized by a Sagitta, or sag, profile that achieves a function. In geometry, Sagitta may represent the distance from the center of an arc to the center of the base of the arc. In optics, Sagitta, or sag, may relate to a convex or concave curvature and may represent the height or depth of a surface as measured at any radial distance away from a vertex along the direction of an optical axis. A sag profile may represent sag values across a two-dimensional grid or a one-dimensional cross-section of an optical element. For example, an optical zone that provides vision correction for the user may have a sag profile that corrects a refractive error of the user's eye. As another example, another optical zone that performs beam shaping and/or steering of an integrated illumination source may have a sag profile that acts as a prism that refracts light from the illumination source toward the user's eye. Still another optical zone may have a flat sag profile that may serve as a viewing window for a sensor or camera that is mounted on or behind the zonal lens without distorting an image that is captured by the sensor or camera. In some examples, optical zones may be connected to one another via transition zones. The transition zones may provide smooth, continuous transitions between optical zones.

Figure 4:
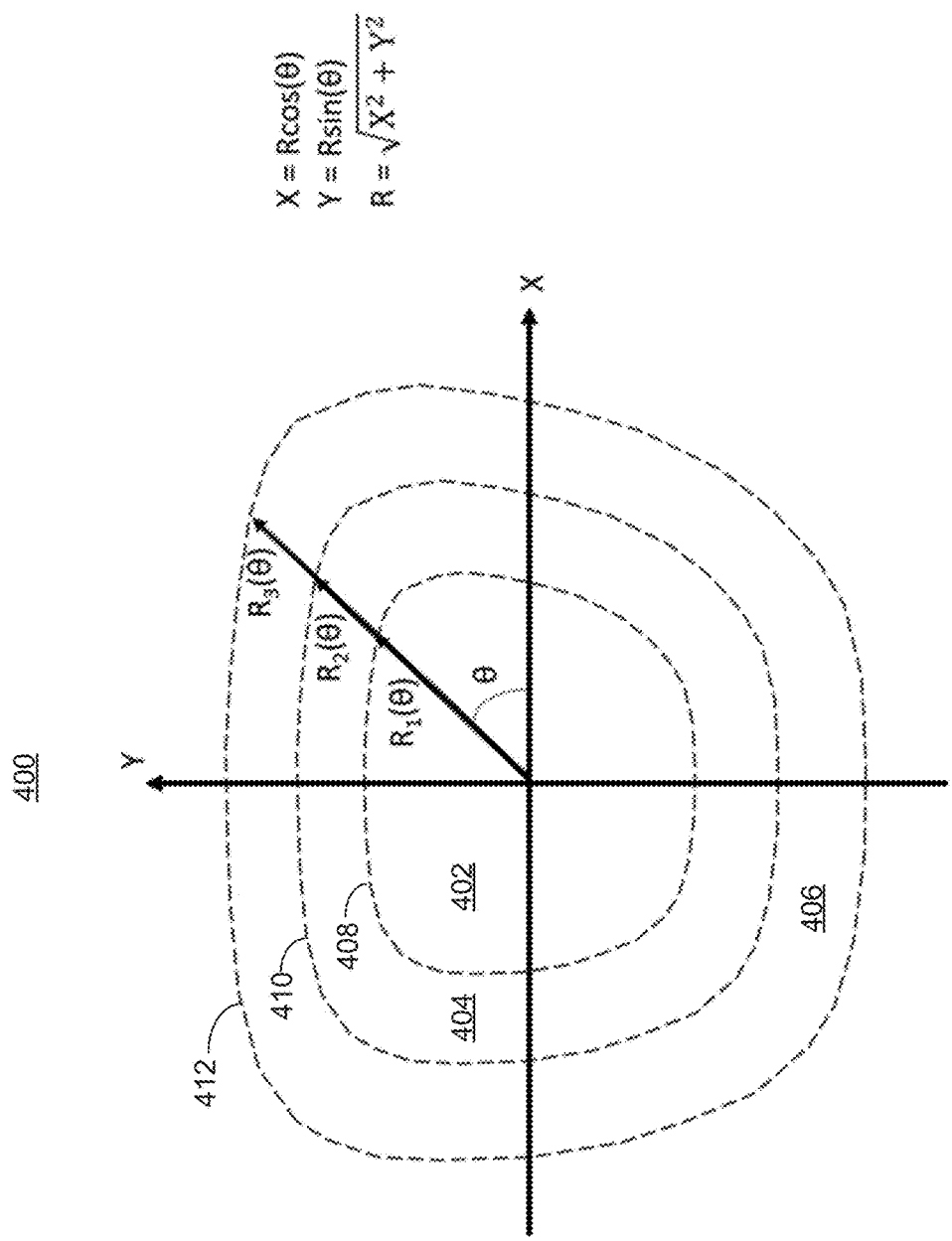
FIG. 4 illustrates a diagram of an example optical zone arrangement defining optical zones in terms of polar coordinates, according to an example.

In some examples, a zonal lens may be designed in a piece-wise fashion. Boundaries of optical zones may be defined on a rectilinear grid using a functional form. The functional form may be expressed in Cartesian or polar coordinates. FIG. 4 illustrates a diagram of an example optical zone arrangement 400 defining optical zones 402, 404, 406 in terms of polar coordinates. The optical zones 402, 404, 406 may have associated boundaries 408, 410, 412. The shapes of the boundaries 408, 410, 412 may be arbitrary to achieve the desired functionality of the surface, e.g., the optical zones 402, 404, 406. As represented in FIG. 4, the boundaries 408, 410, 412 may be shaped to define annular optical zones 402, 404, 406. In the optical zone arrangement 400, the boundaries 408, 410, 412 may be characterized by equations of the general form $X = R \cos \theta$, $Y = R \sin \theta$, $R = \sqrt{X^2 + Y^2}$ where R represents the radius of an annular optical zone and $\theta$ represents an angle having a value between $-180°$ and $+180°$. In some examples, boundaries may be characterized by equations that are expressed in terms of Cartesian coordinates.

Figure 5:
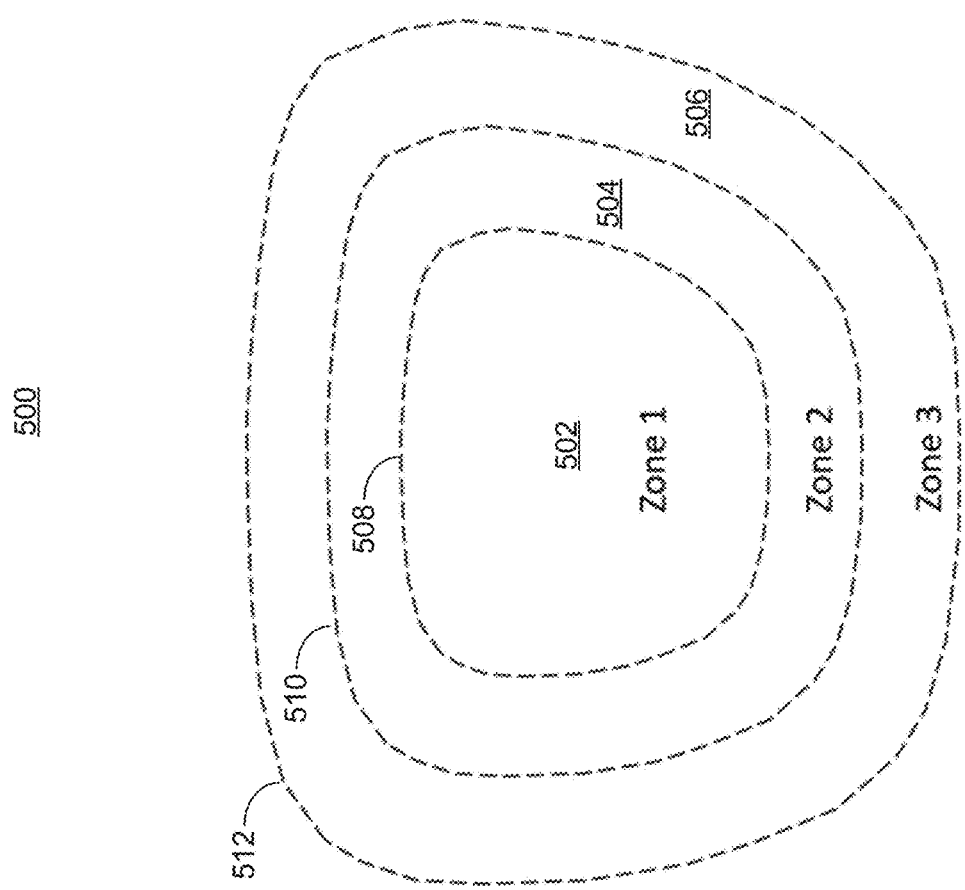
FIG. 5 illustrates a diagram of an example optical zone arrangement defining annular optical zones, according to some examples.

FIG. 5 illustrates a diagram of an example optical zone arrangement 500 defining annular optical zones 502, 504, 506. In some examples, the optical zones 502, 504, 506 may be defined in terms of polar coordinates. For example, the optical zones 502, 504, 506 may be characterized in that, for a given value of an angle $\theta$, the sag profile of the zonal lens depends on a radial coordinate R. Each optical zone 502, 504, 506 may be characterized by a respective sag profile that achieves a function, such as vision correction, beam steering, or providing a flat viewing window for a sensor or camera. Each optical zone 502, 504, 506 may be characterized by a function that defines the sag profile within that optical zone. For example, for values of the radial coordinate R falling within optical zone 504, the sag profile may be characterized by a function that results in beam steering. The optical zones 502, 504, 506 may have associated boundaries 508, 510, 512. As represented in FIG. 5, the shapes of the boundaries 508, 510, 512 may be arbitrary to achieve the desired functionality of the surface, e.g., the optical zones 502, 504, 506. In the optical zone arrangement 500, the boundaries 508, 510, 512 may be characterized by functions $F_1$, $F_2$, $F_3$. In some examples, transition zones near the boundaries 508, 510, 512 provide smooth, continuous transitions between the optical zones 502, 504, 506.

Figure 6:
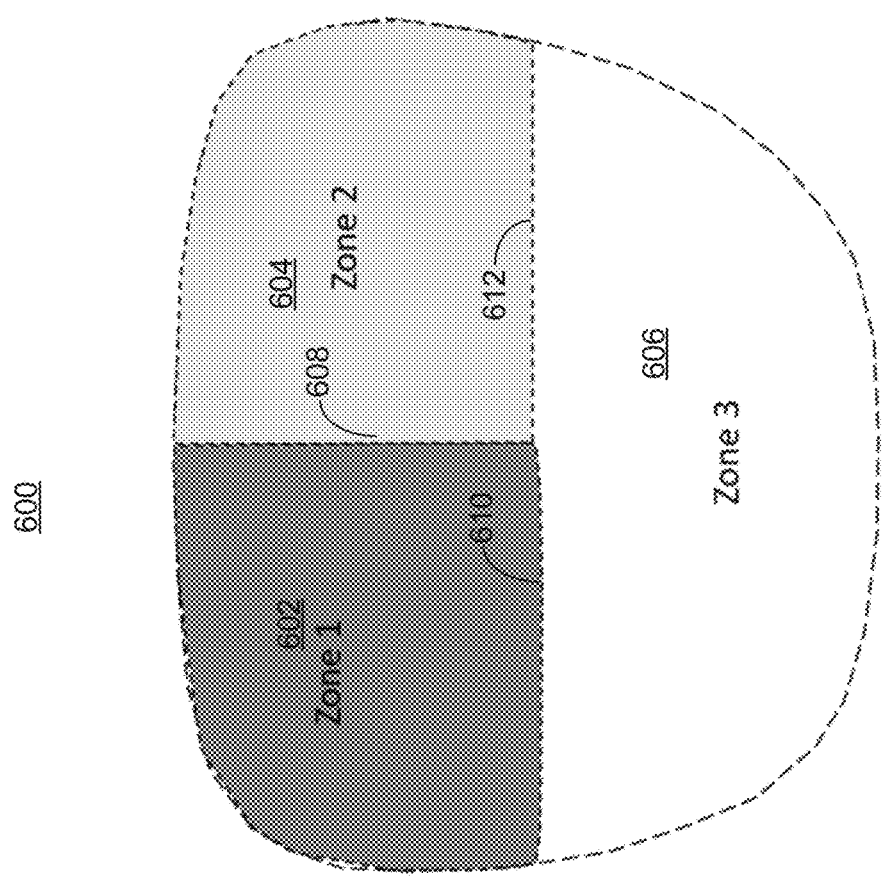
FIG. 6 illustrates a diagram of an example optical zone arrangement defining rectilinear optical zones, according to some examples.

FIG. 6 illustrates a diagram of an example optical zone arrangement 600 defining rectilinear optical zones 602, 604, 606. In some examples, the optical zones 602, 604, 606 may be defined in terms of Cartesian coordinates. Each optical zone 602, 604, 606 may be characterized by a respective sag profile that achieves a function, such as vision correction, beam steering, or providing a flat viewing window for a sensor or camera. Each optical zone 602, 604, 606 may be characterized by a function that defines the sag profile within that optical zone. For example, for values of the Cartesian coordinates x, y falling within optical zone 602, the sag profile may be characterized by a function that results in vision correction. For values of the Cartesian coordinates x, y falling within optical zone 604, the sag profile may be characterized by a function that results in beam steering. For values of the Cartesian coordinates x, y falling within optical zone 606, the sag profile may be characterized by a function that results in a flat sag profile. The optical zones 602, 604, 606 may have associated boundaries 608, 610, 612. As represented in FIG. 6, the shapes of the boundaries 608, 610, 612 may be arbitrary to achieve the desired functionality of the surface, e.g., the optical zones 602, 604, 606. In the optical zone arrangement 400, the boundaries 602, 604, 606 may be characterized by functions $G_1$, $G_2$, $G_3$. In some examples, transition zones near the boundaries 608, 610, 612 provide smooth, continuous transitions between the optical zones 602, 604, 606.

Figure 7:
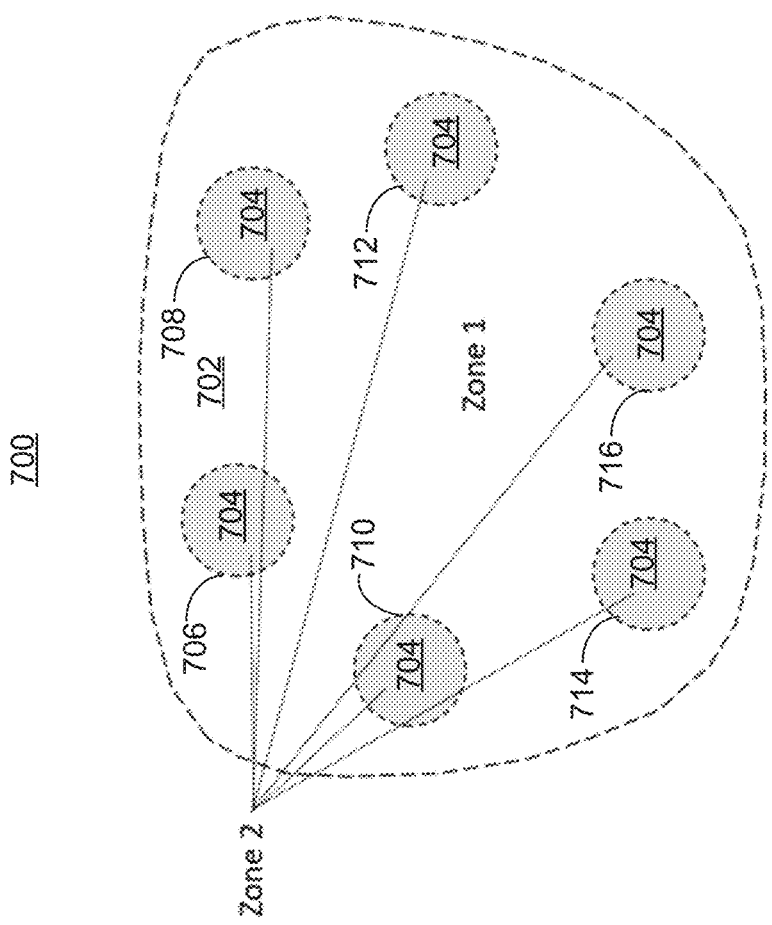
FIG. 7 illustrates a diagram of an example optical zone arrangement defining sparsely distributed optical zones, according to an example.

FIG. 7 illustrates a diagram of an example optical zone arrangement 700 defining sparsely distributed optical zones. In some examples, the optical zones 702, 704 may be defined in terms of Cartesian coordinates, e.g., as discontinuous functions of Cartesian coordinates (x,y). In some examples, the optical zones 702, 704 may be defined in terms of polar coordinates, e.g., as discontinuous functions of polar coordinates (R, 8). Each optical zone 702, 704 may be characterized by a respective sag profile that achieves a function, such as vision correction, beam steering, or providing a flat viewing window for a sensor or camera. For example, the optical zone 702 may be used for vision correction, and the optical zone 704 may include a plurality of beam steering regions. The plurality of beam steering regions may be used, e.g., to steer individual illuminators, such as light emitting diodes (LEDs) or vertical cavity surface emitting lasers (VCSELs). The optical zone 704 may be a sparse optical zone that is distributed or discontinuous across the optical zone 702. For example, while the optical zone 704 is illustrated in FIG. 7 as comprising multiple discontinuous regions, the regions may be considered to constitute a single optical zone because the regions share a common sag profile. In some examples, the multiple discontinuous regions of the optical zone 704 may have slightly different sag profiles. For example, if the discontinuous regions correspond to individual illuminators, each region may be characterized by a sag profile that is optimized for its corresponding illuminator. As represented in FIG. 7, the shapes of the optical zones 702, 704 may be arbitrary to achieve the desired functionality of the surface, e.g., the optical zones 702, 704. In the optical zone arrangement 700, the optical zones 702, 704 may be characterized by functions $H_1$, $H_2$. In some examples, the regions constituting the optical zone 704 may be separated from the optical zone 702 by transition zones located near boundaries 706, 708, 710, 712, 714, 716 that may provide smooth, continuous transitions between the optical zone 702 and the regions constituting the optical zone 704.

In some examples, the optical zones may be defined to have specific sag profiles that exist within their respective boundaries. For example, referring to FIG. 5, each optical zone 502, 504, 506 may have a sag profile that is not shared with any other optical zone. Similarly, referring to FIG. 6, the sag profiles for optical zones 602, 604, 606 may all differ from one another. Referring to FIG. 7, the regions forming optical zone 704 may have the same sag profile, which may differ from the sag profile of optical zone 702. Each sag profile may be characterized by a function that is defined over the same rectilinear grid as the boundary shapes. A sag profile may be characterized by any of a variety of profiles. For example, a sag profile may be flat (e.g., zero sag), linear, spherical, aspheric, or freeform. Freeform sag profiles may be characterized, for example, by Zernike polynomials, XY polynomials, and the like.

Figure 8:
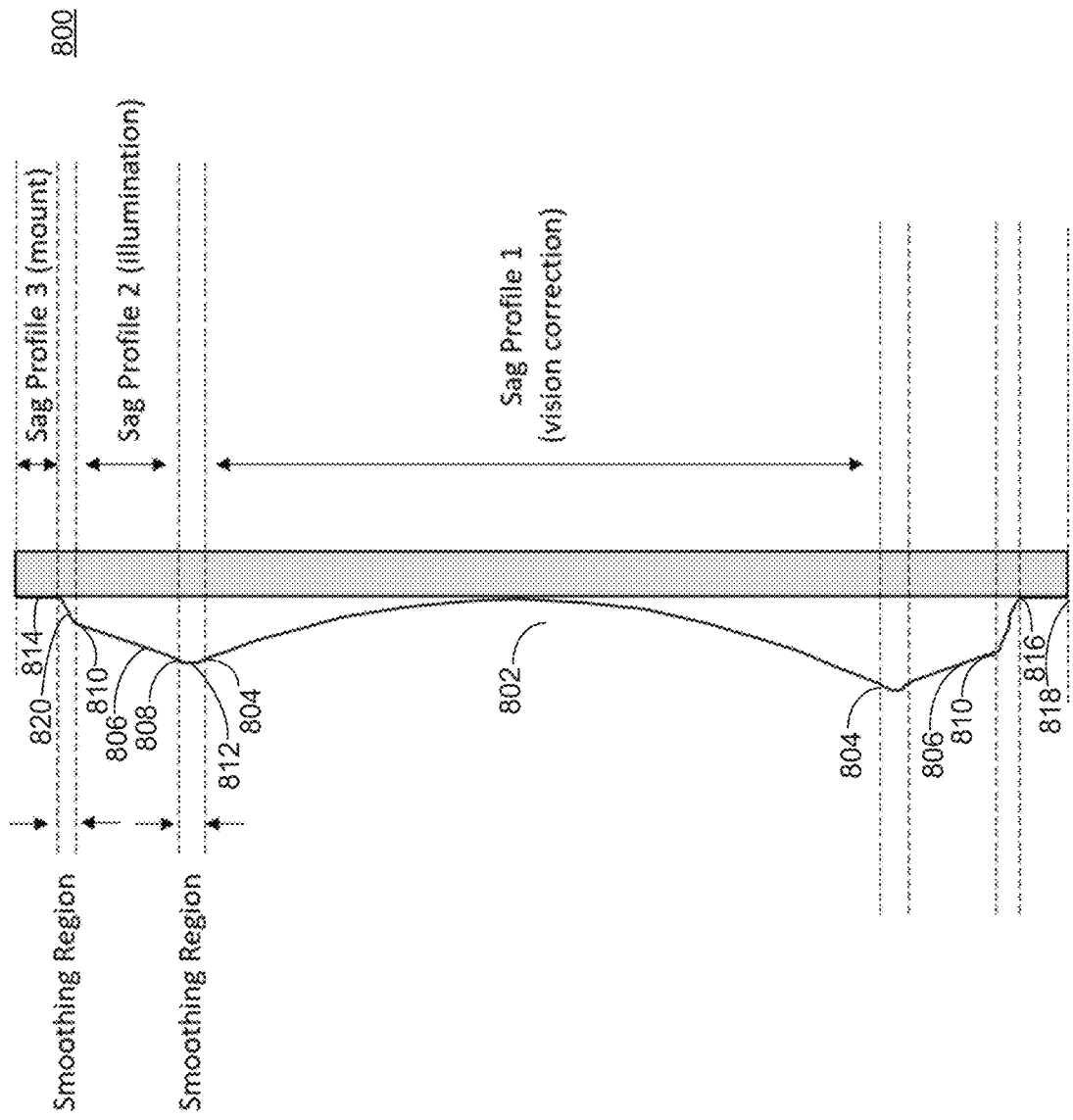
FIG. 8 illustrates a diagram representing a sectional view of an example zonal lens that achieves a plurality of functions, according to some examples.

FIG. 8 illustrates a diagram representing a sectional view of an example zonal lens 800 that achieves a plurality of functions according to some examples. The zonal lens 800 may be fabricated using any of a variety of freeform manufacturing methods, including, but not limited to, diamond turning, three-dimensional (3D) printing, and/or computer-controlled polishing.

The example zonal lens 800 is illustrated as implementing annular optical zones. It will be appreciated that the disclosed subject matter may be practiced using boundary zones having other shapes, including, but not limited to rectilinear and/or sparse boundary zones as represented in FIGS. 6 and 7, respectively.

Referring again to FIG. 8, an innermost optical zone 802 may act as a spectacle lens. The optical zone 802 may have a sag profile that is characterized by a curvature that corrects refractive errors of an eye of the user. The optical zone 802 may be demarcated by a boundary 804, which may be sized to provide comfortable viewing to the user over a reasonable field of view.

An optical zone 806 may act as a prism that steers light from a light source toward an eye of the user. The optical zone 806 may have a sag profile that refracts light toward the eye of the user. Accordingly, the optical zone 806 may facilitate illuminating the eye for eye tracking purposes, e.g., with a laser or a light emitting diode (LED) operating at infrared wavelengths. Without the optical zone 806, light from an off-axis light source may be refracted away from the eye of the user. This may make illuminating the eye more difficult and less efficient. Further, because each user has a unique spectacle lens curvature in the optical zone 802, the optical zone 806 may reduce or eliminate much of the variability in illumination performance introduced by different users. For example, illumination performance may be similar between one user who has a weak vision correction prescription and another user who has a strong vision correction prescription. As another example, illumination performance may be similar between a farsighted user and a nearsighted user.

The optical zone 806 may be demarcated by boundaries 808 and 810. A transition zone 812 may be defined between the boundary 808 and the boundary 804 of the optical zone 802. The transition zone 812 may keep the surface of the zonal lens 800 smooth and continuous between the optical zone 802 and the optical zone 806.

An outermost optical zone 814 may be implemented as a flat zone that serves as a user-agnostic viewing window for an optical sensor or camera. The optical sensor or camera may be mounted on or behind the zonal lens 800, e.g., in a frame, oriented with a view through the optical zone 814. Without the optical zone 814, the optical sensor or camera may sense through the thickest part of the curved spectacle lens and may experience variable amounts of optical aberrations and prismatic deviations according to the vision correction prescription of the user. The flat edge of the optical zone 814 may simplify the mounting interface of the zonal lens 800, making it easier to mount, seal, and bond the zonal lens 800 into a frame of a head-mounted display (HMD) device.

The optical zone 814 may be demarcated by boundaries 816 and 818. A transition zone 820 may be defined between the boundary 816 and the boundary 810 of the optical zone 806. The transition zone 820 may keep the surface of the zonal lens 800 smooth and continuous between the optical zone 806 and the optical zone 814.

In some examples, one or more of the transition zones 812, 820 may be characterized by a freeform transition function that smoothly connects adjacent optical zones, e.g., the optical zone 802 and the optical zone 806 or the optical zone 806 and the optical zone 814. The freeform transition function may take the form of a series polynomial that is radially oriented with respect to the center of the zonal lens 800. The series polynomial may have coefficients that are determined via Hermite interpolation. One example of a series polynomial is a cubic polynomial that satisfies the following system of equations:

$$C_3 r_1^3 + C_2 r_1^2 + C_1 r_1 + C_0 = z_1(r_1);$$

$$C_3 r_2^3 + C_2 r_2^2 + C_1 r_2 + C_0 = z_2(r_2);$$

$$3C_3 r_1^2 + 2C_2 r_1 = z'_1(r_1); \text{ and}$$

$$3C_3 r_2^2 + 2C_2 r_2 = z'_2(r_2),$$

where $z_1$ may represent the sag at the boundary 804 of the optical zone 802, $z_2$ may represent the sag at the boundary 808 of the optical zone 806, r may represent the spatial coordinate, and C may represent the set of coefficients defining the polynomial smoothing function.

It will be appreciated that other types of optical zones may be implemented consistent with the disclosed subject matter. For example, an optical zone may include a fiducial marker for calibration and/or alignment operations. As another example, an optical zone may include engineered edges that may improve the reliability and ruggedness of the zonal lens 800, which may otherwise be fragile.

Figure 9:
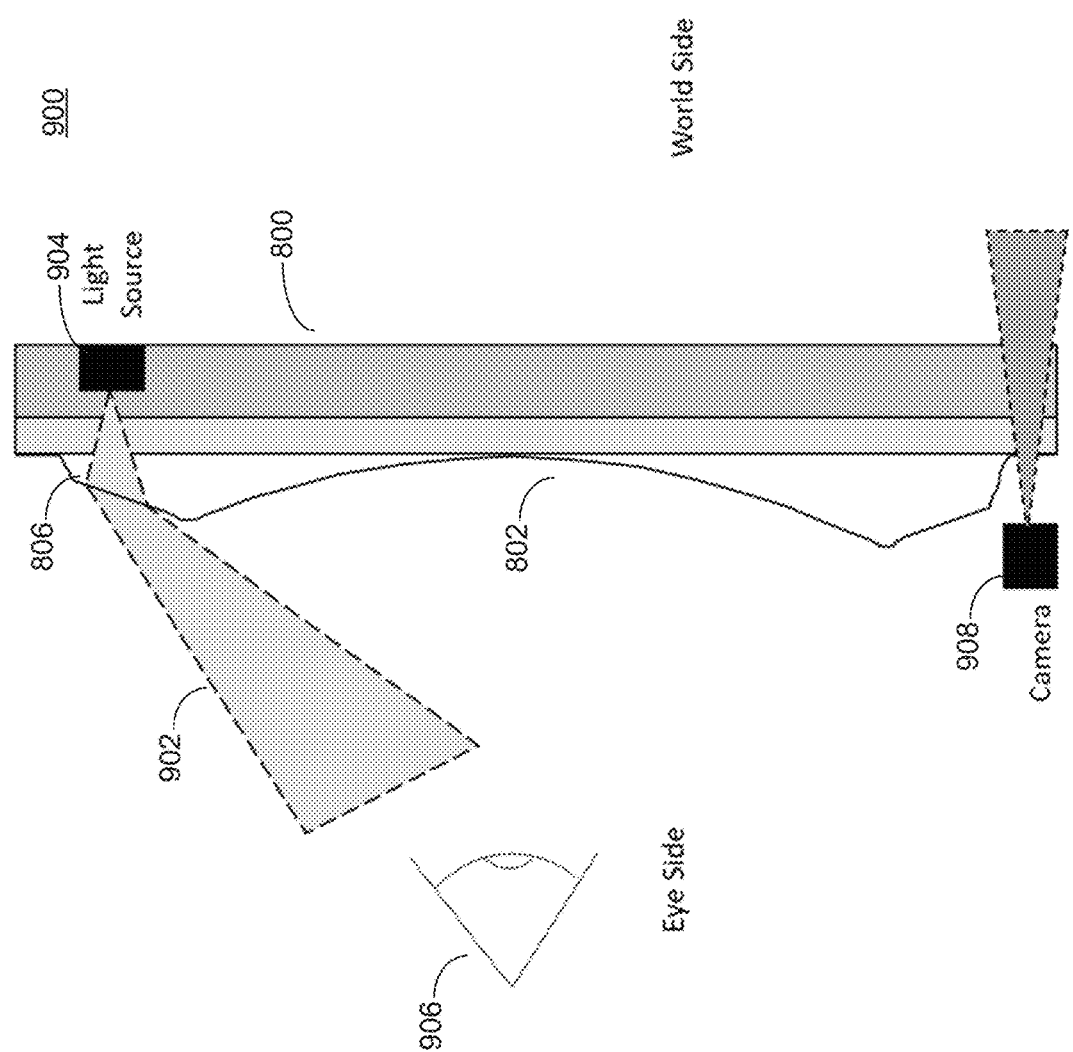
FIG. 9 illustrates a diagram representing an example head-mounted display (HMD) device incorporating the zonal lens of FIG. 8, according to some examples.

FIG. 9 illustrates a diagram representing an example head-mounted display (HMD) device 900 incorporating the zonal lens 800 of FIG. 8 according to some examples. As represented in FIG. 9, the optical zone 802 may be characterized by a sag profile that corrects the vision of the user. The optical zone 806 may act as a prism that steers a light beam 902 that is emitted by a light source 904 toward an eye 906 of the user. The optical zone 814 may act as a window for an optical sensor or a camera 908. The camera 908 may be oriented to face the world side of the head-mounted display (HMD) device 900 or the eye side of the head-mounted display (HMD) device 900. The orientation of the camera 908 may be dependent on the use of the camera 908 in the head-mounted display (HMD) device 900. For example, if the camera 908 performs eye tracking, the camera 908 may be oriented to face the eye side of the head-mounted display (HMD) device 900. As another example, if the camera 908 captures images of the environment, the camera 908 may be oriented to face the world side of the head-mounted display (HMD) device 900.

Figure 10:
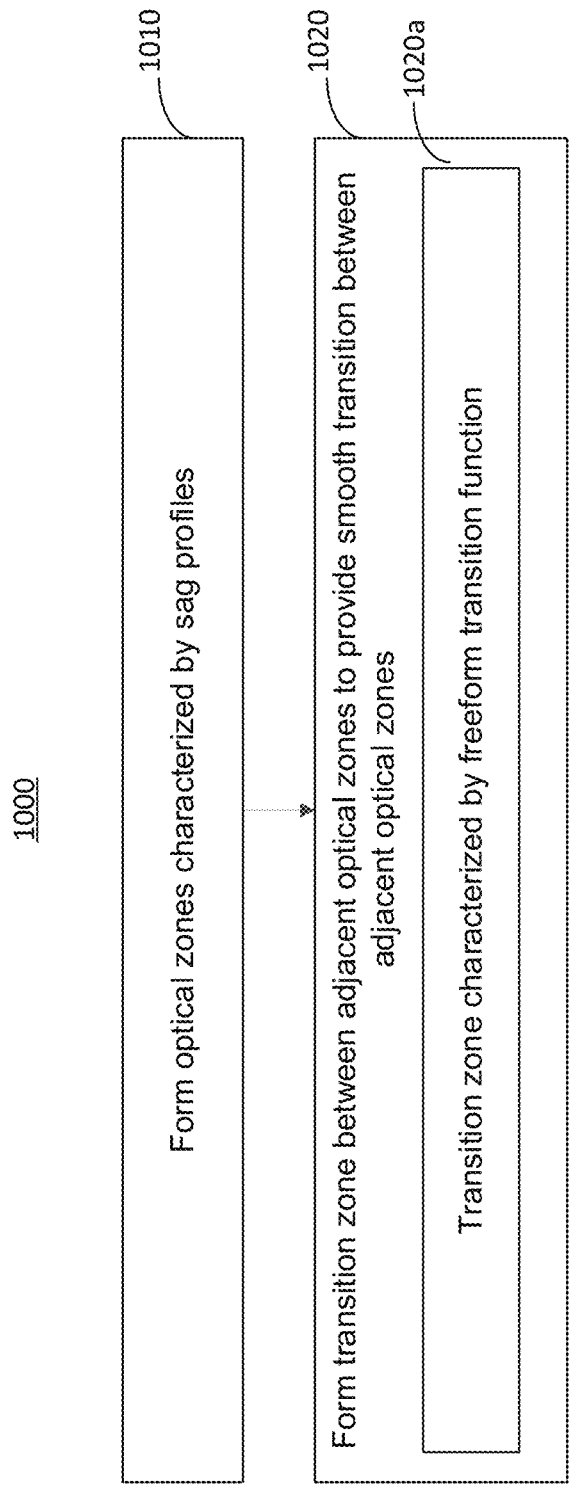
FIG. 10 is a flow diagram illustrating an example method for creating a zonal lens for a head-mounted display (HMD) device, according to various examples.

FIG. 10 is a flow diagram illustrating an example method 1000 for creating a zonal lens for a head-mounted display (HMD) device, according to various examples. In various examples, the method 1000 may be performed by a device (e.g., a fabrication system). In some examples, the method 1000 is performed by processing logic, including hardware, firmware, software, or a combination thereof. The method 1000 may be performed by a processor executing code stored in a non-transitory computer-readable medium (e.g., a memory). Briefly, in various examples, the method 1000 may include forming a plurality of optical zones, each of which is characterized by a respective sag profile. A transition zone may be formed between adjacent optical zones to provide a smooth transition between the adjacent optical zones.

As represented by block 1010, in various examples, the method 1000 may include forming a plurality of optical zones, each of which is characterized by a respective sag profile. In geometry, Sagitta may represent the distance from the center of an arc to the center of the base of the arc. In optics, Sagitta, or sag, may relate to a convex or concave curvature and may represent the height or depth of a surface as measured at any radial distance away from a vertex along the direction of an optical axis. A sag profile may represent sag values across a two-dimensional grid or a one-dimensional cross-section of an optical element. For example, one optical zone may have a sag profile that is characterized by a curvature that corrects refractive errors of the eye of the user, such as myopia, hyperopia, astigmatism, presbyopia, and the like. The optical zone may be shaped and/or sized to provide comfortable viewing to the user over a reasonable field of view. Another optical zone may have a sag profile that refracts a path of an illumination light beam from a light source toward an eye of the user. Still another optical zone may have a flat or curved sag profile that may serve as a user-agnostic viewing window for an optical sensor or camera. This may reduce or eliminate distortion in the image captured by the optical sensor or camera.

As represented by block 1020, in various examples, the method 1000 may include forming a transition zone between adjacent optical zones to provide a smooth transition between the adjacent optical zones. In some examples as represented by block 1020a, the transition zone may be characterized by a freeform transition function that smoothly connects adjacent optical zones. The freeform transition function may take the form of a series polynomial that is radially oriented with respect to the center of the zonal lens. The series polynomial may have coefficients that are determined via Hermite interpolation. One example of a series polynomial is a cubic polynomial that satisfies the following system of equations:

$$C_3 r_1^3 + C_2 r_1^2 + C_1 r_1 + C_0 = z_1(r_1);$$

$$C_3 r_2^3 + C_2 r_2^2 + C_1 r_2 + C_0 = z_2(r_2);$$

$$3C_3 r_1^2 + 2C_2 r_1 = z'_1(r_1); \text{ and}$$

$$3C_3 r_2^2 + 2C_2 r_2 = z'_2(r_2),$$

where $z_1$ may represent the sag at the edge of the first optical zone, $z_2$ may represent the sag at the edge of the second optical zone, r may represent the spatial coordinate, and C may represent the set of coefficients defining the polynomial smoothing function.

Figure 11:
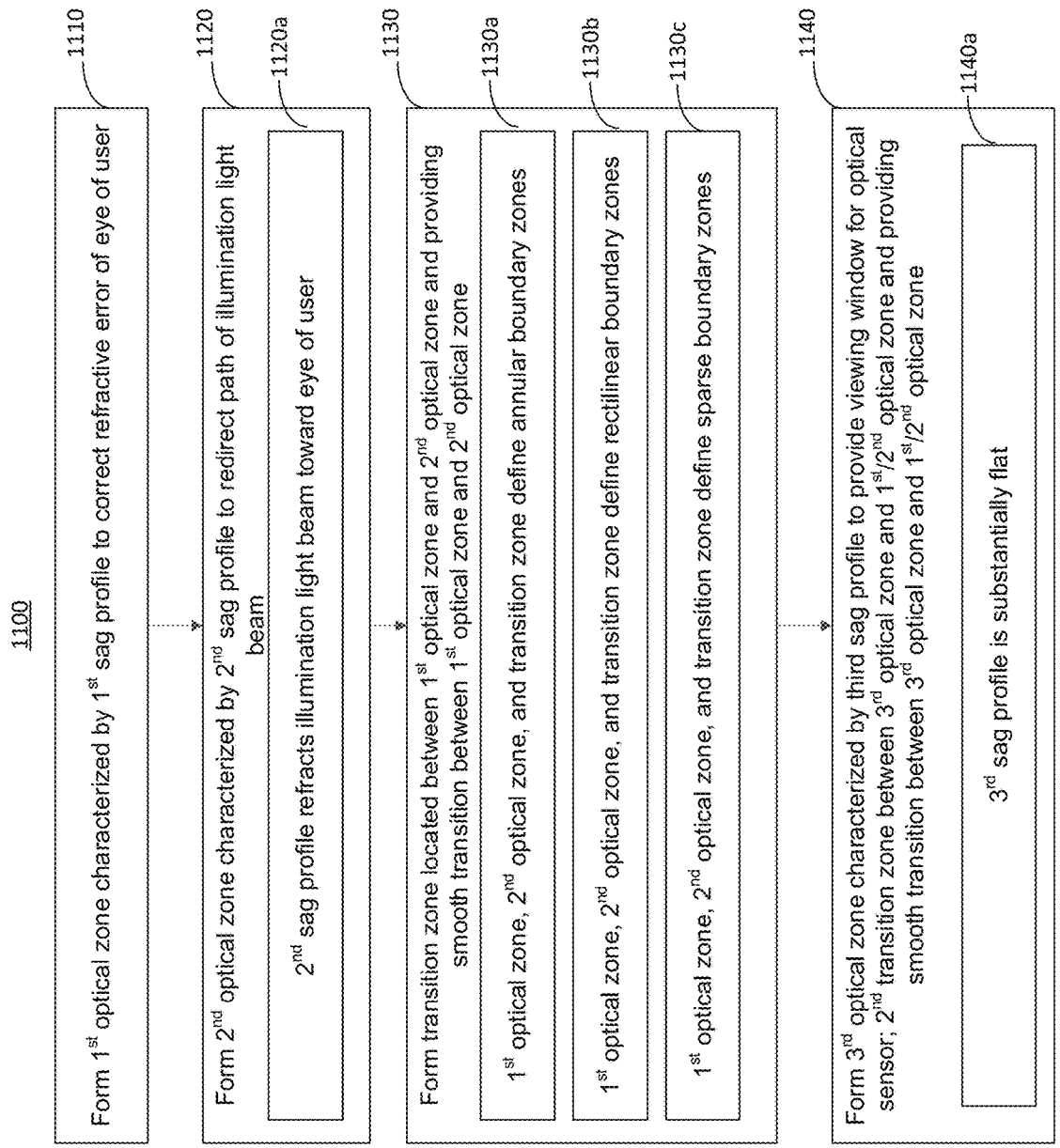
FIG. 11 is a flow diagram illustrating an example method for creating a zonal lens for a head-mounted display (HMD) device, according to various examples.

FIG. 11 is a flow diagram illustrating an example method 1100 for creating a zonal lens for a head-mounted display (HMD) device, according to various examples. In various examples, the method 1100 may be performed by a device (e.g., a fabrication system). In some examples, the method 1100 is performed by processing logic, including hardware, firmware, software, or a combination thereof. The method 1100 may be performed by a processor executing code stored in a non-transitory computer-readable medium (e.g., a memory). Briefly, in various examples, the method 1100 may include forming a first optical zone characterized by a first sag profile to correct a refractive error of an eye of a user and a second optical zone characterized by a second sag profile to redirect a path of an illumination light beam. A transition zone may be formed between the first optical zone and the second optical zone to provide a smooth transition between the first optical zone and the second optical zone.

As represented by block 1110, in various examples, the method 1100 may include forming a first optical zone characterized by a first sag profile to correct a refractive error of an eye of a user. For example, the first sag profile may be characterized by a curvature that corrects refractive errors of the eye of the user, such as myopia, hyperopia, astigmatism, presbyopia, and the like. The first optical zone may be shaped and/or sized to provide comfortable viewing to the user over a reasonable field of view.

As represented by block 1120, in various examples, the method 1100 may include forming a second optical zone characterized by a second sag profile to redirect a path of an illumination light beam. As represented by block 1120a, the second sag profile may cause the second optical zone to act as a prism that refracts an illumination light beam from a light source toward an eye of the user. The second optical zone may facilitate illuminating the eye for eye tracking purposes, e.g., with a laser or a light emitting diode (LED) operating at infrared wavelengths. Without the second optical zone, light from an off-axis light source may be refracted away from the eye of the user. This may make illuminating the eye more difficult and less efficient. Further, because each user has a unique spectacle lens curvature in the first optical zone, the second optical zone may reduce or eliminate much of the variability in illumination performance introduced by different users. For example, illumination performance may be similar between one user who has a weak vision correction prescription and another user who has a strong vision correction prescription. As another example, illumination performance may be similar between a farsighted user and a nearsighted user.

As represented by block 1130, in various examples, the method 1100 may include forming a transition zone that is located between the first optical zone and the second optical zone. The transition zone may provide a smooth transition between the first optical zone and the second optical zone. In some examples, the transition zone may be characterized by a freeform transition function that smoothly connects adjacent optical zones, e.g., the first optical zone and the second optical zone. The freeform transition function may take the form of a series polynomial that is radially oriented with respect to the center of the zonal lens. The series polynomial may have coefficients that are determined via Hermite interpolation. One example of a series polynomial is a cubic polynomial that satisfies the following system of equations:

$$C_3r_1^3+C_2r_1^2+C_1r_1+C_0=z_1(r_1);$$

$$C_3r_2^3+C_2r_2^2+C_1r_2+C_0=z_2(r_2);$$

$$3C_3r_1^2+2C_2r_1=z'_1(r_1); \text{ and}$$

$$3C_3r_2^2+2C_2r_2=z'_2(r_2),$$

where $z_1$ may represent the sag at the edge of the first optical zone, $z_2$ may represent the sag at the edge of the second optical zone, r may represent the spatial coordinate, and C may represent the set of coefficients defining the polynomial smoothing function.

The optical zones and the transition zone may define boundary zones. The boundary zones may have any of a variety of shapes. In some examples, as represented by block 1130a, the first optical zone, the second optical zone, and the transition zone define annular boundary zones. In some examples, as represented by block 1130b, the first optical zone, the second optical zone, and the transition zone define rectilinear boundary zones. A rectilinear boundary zone may be characterized by a substantially rectangular shape. In some examples, as represented by block 1130c, the first optical zone, the second optical zone, and the transition zone define sparse boundary zones. Sparse boundary zones may be characterized by one or more optical zones that are discontinuous, as illustrated, for example, in FIG. 7.

As represented by block 1140, in various examples, the method 1100 may include forming a third optical zone characterized by a third sag profile to provide a viewing window for an optical sensor. As represented by block 1140a, the third sag profile may be substantially flat. The third optical zone may be implemented as a flat zone that serves as a user-agnostic viewing window for an optical sensor or camera. Implementing the third optical zone as a flat zone may reduce or eliminate distortion in the image captured by the optical sensor or camera. The optical sensor or camera may be mounted on the third optical zone. Without the third optical zone, the optical sensor or camera may sense through the thickest part of the curved spectacle lens and may experience variable amounts of optical aberrations and prismatic deviations according to the vision correction prescription of the user. The flat edge of the third optical zone may simplify the mounting interface of the zonal lens, making it easier to mount, seal, and bond the zonal lens into a frame of a head-mounted display (HMD) device.

A second transition zone may be formed between the third optical zone and at least one of the first optical zone or the second optical zone. The second transition zone may provide a smooth transition between the third optical zone and the at least one of the first optical zone or the second optical zone. The second transition zone may provide a smooth transition between the third optical zone and the first optical zone or the second optical zone. In some examples, the second transition zone may be characterized by a freeform transition function that smoothly connects adjacent optical zones, e.g., the third optical zone and the first optical zone or the second optical zone. The freeform transition function may take the form of a series polynomial that is radially oriented with respect to the center of the zonal lens. The series polynomial may have coefficients that are determined via Hermite interpolation. One example of a series polynomial is a cubic polynomial that satisfies the following system of equations:

$$C_3r_1^3+C_2r_1^2+C_1r_1+C_0=z_1(r_1);$$

$$C_3r_2^3+C_2r_2^2+C_1r_2+C_0=z_2(r_2);$$

$$3C_3r_1^2+2C_2r_1=z'_1(r_1); \text{ and}$$

$$3C_3r_2^2+2C_2r_2=z'_2(r_2),$$

where $z_1$ may represent the sag at the edge of the third optical zone, $z_2$ may represent the sag at the edge of the first optical zone or the second optical zone, r may represent the spatial coordinate, and C may represent the set of coefficients defining the polynomial smoothing function.

In the foregoing description, various examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example' is not necessarily to be construed as preferred or advantageous over other embodiments or designs.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

The invention claimed is:

1. A near-eye display device comprising:
a light source to generate a light beam;
a camera; and
an optical component comprising:
a first optical zone characterized by a first sag profile to correct a refractive error of an eye of a user;
a second optical zone characterized by a second sag profile to redirect a path of the light beam from the light source to the eye of the user, wherein the light source is oriented with a view only through the second optical zone; and
a third optical zone characterized by a third sag profile to provide viewing window for the camera, wherein the camera is oriented to view through the third optical zone.

2. The near-eye display device of claim 1, wherein the optical component further comprises:

a first transition zone located between the first optical zone and the second optical zone and providing a smooth transition between the first optical zone and the second optical zone; and a second transition zone located between the third optical zone and one of the first optical zone or the second optical zone and providing a smooth transition between the third optical zone and the one of the first optical zone or the second optical zone.

3. The near-eye display device of claim 2, wherein the third sag profile of the third optical zone is substantially flat.

4. The near-eye display device of claim 2, wherein the first optical zone, the second optical zone, and the first transition zone define annular boundary zones.

5. The near-eye display device of claim 2, wherein the first optical zone, the second optical zone, and the first transition zone define rectilinear boundary zones.

6. The near-eye display device of claim 2, wherein the first optical zone, the second optical zone, and the first transition zone define sparse boundary zones.

7. The near-eye display device of claim 1, wherein the first sag profile of the first optical zone has a curvature that corrects at least one of myopia, hyperopia, astigmatism, or presbyopia of the eye of the user.

8. A head-mounted display (HMD) device, comprising:
a light source to emit a light beam; and
an optical component comprising:
    a first optical zone characterized by a first sag profile to correct a refractive error of an eye of a user;
    a second optical zone characterized by a second sag profile to redirect a path of the light beam from the light source toward the eye of the user, wherein the light source is oriented with a view only through the second optical zone of the optical component; and
    a first transition zone located between the first optical zone and the second optical zone and providing a smooth transition between the first optical zone and the second optical zone.

9. The head-mounted display (HMD) device of claim 8, further comprising:
a camera,
wherein the optical component further comprises:
    a third optical zone characterized by a third sag profile to provide a viewing window for the camera, wherein the camera is oriented with a view only through the third optical zone; and
    a second transition zone located between the third optical zone and one of the first optical zone or the second optical zone and providing a smooth transition between the third optical zone and the one of the first optical zone or the second optical zone.

10. The head-mounted display (HMD) device of claim 9, wherein the third sag profile of the third optical zone is substantially flat.

11. The head-mounted display (HMD) device of claim 8, wherein the first optical zone, the second optical zone, and the first transition zone define annular boundary zones.

12. The head-mounted display (HMD) device of claim 8, wherein the first optical zone, the second optical zone, and the first transition zone define rectilinear boundary zones.

13. The head-mounted display (HMD) device of claim 8, wherein the first optical zone, the second optical zone, and the first transition zone define sparse boundary zones.

14. A method of manufacturing a head-mounted display (HMD) device, the method comprising:
manufacturing an optical component to be placed in the head-mounted display (HMD) device, comprising:
    forming a first optical zone of the optical component characterized by a first sag profile to correct a refractive error of an eye of a user;
    forming a second optical zone of the optical component characterized by a second sag profile to redirect a path of a light beam from a light source toward the eye of the user; and
    forming a first transition zone located between the first optical zone and the second optical zone and providing a smooth transition between the first optical zone and the second optical zone,
wherein the light source is oriented with a view only through the second optical zone of the optical component.

15. The method of claim 14, wherein manufacturing the optical component further comprises:
    forming a third optical zone of the optical component characterized by a third sag profile to provide a viewing window for a camera to view through the third optical zone; and
    forming a second transition zone located between the third optical zone and one of the first optical zone or the second optical zone and providing a smooth transition between the third optical zone and the one of the first optical zone or the second optical zone,
wherein the camera is oriented with a view only through the third optical zone.

16. The method of claim 15, wherein the third sag profile of the third optical zone is substantially flat.

17. The method of claim 14, wherein the first sag profile of the first optical zone has a curvature that corrects at least one of myopia, hyperopia, astigmatism, or presbyopia of the eye of the user.

18. The method of claim 14, wherein the first optical zone, the second optical zone, and the first transition zone define annular boundary zones.

19. The method of claim 14, wherein the first optical zone, the second optical zone, and the first transition zone define rectilinear boundary zones.

20. The method of claim 14, wherein the first optical zone, the second optical zone, and the first transition zone define sparse boundary zones.

* * * * *